July 30, 1935.  H. C. BATES  2,009,378
CERAMIC STACK
Filed Nov. 22, 1933
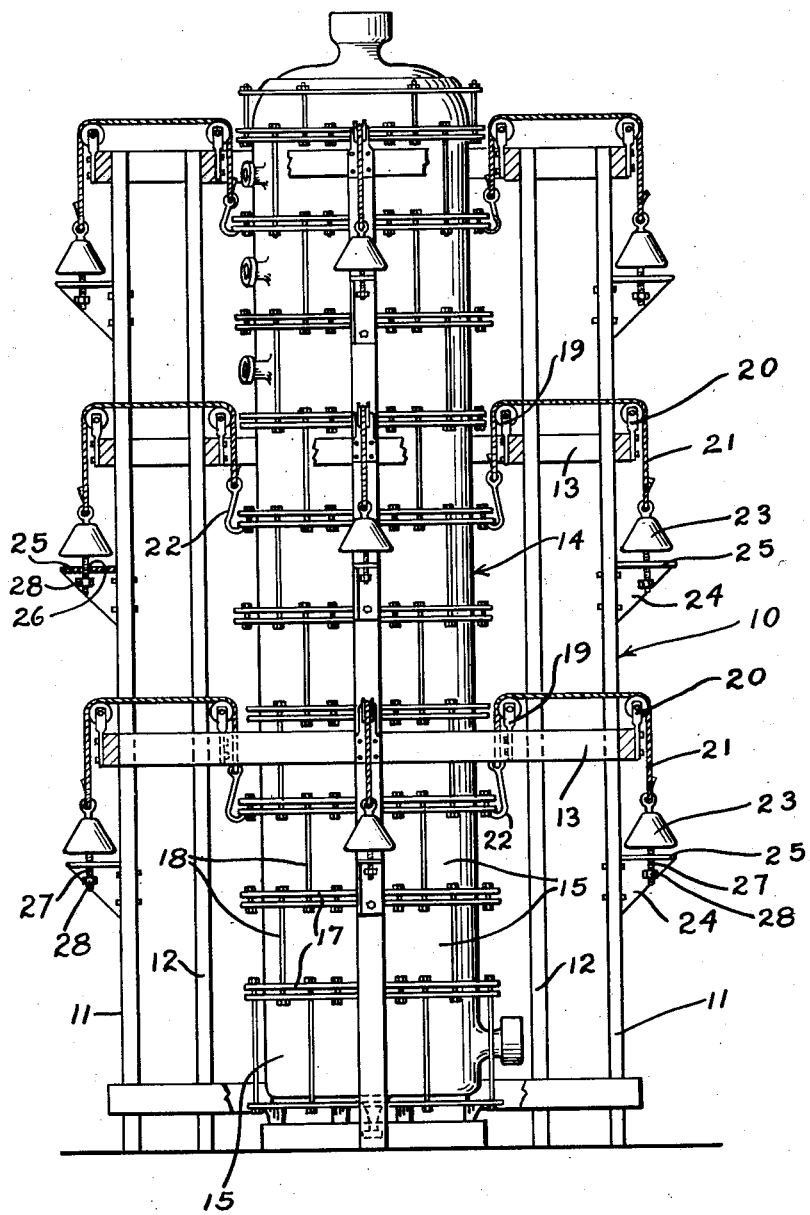
INVENTOR.
H. CLIFFORD BATES
BY *Dorsey & Cole*
ATTORNEYS.

Patented July 30, 1935

2,009,378

UNITED STATES PATENT OFFICE 2,009,378

CERAMIC STACK

Harry Clifford Bates, Corning, N. Y., assignor to Corning Glass Works, Corning, N. Y., a corporation of New York Application November 22, 1933, Serial No. 699,295

4 Claims. (Cl. 23—283)

This invention relates to stacks and more particularly to hollow stacks or towers of ceramic materials such as are used in industrial chemistry and allied industries.

While glass and like ceramic materials possess high crushing strength, it has not heretofore been feasible to produce tall stacks or towers, such, for instance, as absorption towers or fractionating columns, from such materials in spite of the desirability of using them due to their resistance to corrosion. The reason for not more widely employing such materials in constructing tall stacks or towers for use in the chemical and allied industries has been primarily due to the great weights involved and the consequent danger of serious injury to workmen or others employed about such structures should breakage occur.

The primary object of this invention is to render feasible the use of glass or like ceramic materials in the construction of tall stacks or towers such as are employed in the chemical and allied industries.

Another object is to eliminate the danger of injury to workmen or others employed in the vicinity of such towers or stacks.

A further object of my invention is to facilitate the repair or replacement of any parts of a tower or stack which might become injured or broken without requiring that the whole tower be dismantled.

The above and other objects may be accomplished by employing my invention which embodies among its features independently sustaining the weight of sections of a tower or stack on counterweights so that should breakage of one or more sections occur, those supported above it will not fall and contribute to the damage already done.

The drawing is a side view of a tower or stack constructed in accordance with my invention.

In constructing a tower or stack in accordance with my invention I construct a skeleton framework designated generally 10 which includes a plurality of standards 11 and 12 held in spaced parallel relation by horizontally disposed cross members 13 which are fixed to the standards at preferably uniformly spaced intervals.

The tower designated generally 14 is built up of a plurality of hollow cylindrical sections 15 preferably of glass though any other suitable material may be employed. These sections 15 are sealed together to form liquid tight joints at their abutting edges by any suitable means such as gaskets and are held in such relation by flanges 17 and bolts 18. As shown, the lowermost section 15 is formed with a solid bottom while the uppermost section is preferably dome shaped to form a cap. However, different types of end sections may be used according to the process to be carried on.

Secured to the cross members 13 between the standards 12 and the tower 14 are brackets carrying sheaves 19, and secured to the cross members near the standards 11 are brackets carrying sheaves 20. Flexible cables 21 are trained over the sheaves 19 and 20 and attached to the inner ends of the cables are hooks 22 for engagement with certain of the flanges 17 while a counterweight 23 is attached to the outer end of each cable 21. As shown brackets 24 are attached to each standard 11 directly beneath the counterweights 23 and these brackets support shelves 25 which are apertured as at 26 to receive threaded stems 27 which depend from the counterweights. Nuts 28 are threaded on the stems 27 for engagement with the under sides of the shelves 25 and serve as stops to limit upward movement of the counterweights, it being understood that any downward movement of them is limited by their engagement with the shelves 25.

In use should the lowermost section 15 of the tower or stack 14 become broken or damaged, it is obvious that it may be removed and a new one put in its place without disturbing the sections above the lowermost counterweight. Should any part collapse in service, it will be readily seen that the remainder will be supported by the adjacent counterweights and hence much of the danger of personal injury from falling pieces is eliminated as the counterweights will sustain the remainder of the tower or stack.

While in the foregoing there has been shown and described the preferred embodiment of my invention, it is to be understood that minor changes in the details of construction, combination, and arrangement of parts may be resorted to without departing from the spirit and scope of my invention as claimed.

What I claim is:

1. A tower or stack formed of cylindrical glass sections, a skeleton framework around the outside of the tower, sheaves carried by the framework, flexible members trained over the sheaves, means on one end of each flexible member for engaging one section of the tower and a counterweight at the opposite end of each flexible member.

2. A tower or stack formed of cylindrical glass sections, a skeleton framework around the outside of the tower, sheaves carried by the framework, flexible members trained over the sheaves, means on one end of each flexible member for engaging one section of the tower, a counterweight at the opposite end of each flexible member, and means to limit the vertical movement of the counterweights.

3. A tower or stack formed of cylindrical glass sections, a skeleton framework around the outside of the tower, sheaves carried by the framework, flexible members trained over the sheaves, means on one end of each flexible member for engaging one section of the tower, a counterweight at the opposite end of each flexible member, and shelves on the framework beneath the counterweights for limiting their vertical descent.

4. A tower or stack formed of cylindrical glass sections, a skeleton framework around the outside of the tower, sheaves carried by the framework, flexible members trained over the sheaves, means on one end of each flexible member for engaging one section of the tower, a counterweight at the opposite end of each flexible member, shelves on the framework beneath the counterweights for limiting their vertical descent, studs on the counterweights projecting through apertures in the shelves and nuts on the studs for limiting the vertical ascent of the counterweights.

HARRY CLIFFORD BATES.